United States Patent
Block et al.

(10) Patent No.: US 10,921,832 B2
(45) Date of Patent: Feb. 16, 2021

(54) HOT WATER VALVE WITH INTEGRAL THERMOSTATIC MIXING CARTRIDGE

(71) Applicant: Zurn Industries, LLC, Milwaukee, WI (US)

(72) Inventors: Marc G. Block, Apex, NC (US); Michael A. Funari, Apex, NC (US)

(73) Assignee: ZURN INDUSTRIES, LLC, Milwaukee, WI (US)

( * ) Notice: Subject to any disclaimer, the term of this patent is extended or adjusted under 35 U.S.C. 154(b) by 0 days.

(21) Appl. No.: 15/592,404

(22) Filed: May 11, 2017

(65) Prior Publication Data

US 2017/0344035 A1 Nov. 30, 2017

Related U.S. Application Data

(60) Provisional application No. 62/342,480, filed on May 27, 2016.

(51) Int. Cl.
*G05D 23/13* (2006.01)

(52) U.S. Cl.
CPC ............................... *G05D 23/1346* (2013.01)

(58) Field of Classification Search
CPC .. G05D 23/1346; G05D 23/134; G05D 23/13; G05D 23/022; G05D 23/02; G05D 23/1858; G05D 23/1852; F16K 3/0272; F16K 31/002; Y10T 137/87571; Y10T 137/6497
USPC ...... 236/12.2; 137/315.11, 315.12, 468, 602, 137/896; 251/11
See application file for complete search history.

(56) References Cited

U.S. PATENT DOCUMENTS

| | | | | |
|---|---|---|---|---|
| 4,767,052 A | * | 8/1988 | Kostorz | G05D 23/1346 236/12.22 |
| 4,844,116 A | * | 7/1989 | Buehler | E03B 9/02 137/360 |
| 5,931,181 A | * | 8/1999 | Cook | E03C 1/041 137/100 |
| 7,134,451 B1 | | 11/2006 | Malapanes | |
| 7,648,078 B2 | | 1/2010 | Kempf et al. | |
| 7,823,603 B2 | | 11/2010 | Cochart et al. | |
| 8,020,779 B2 | | 9/2011 | Jarvis | |
| 2001/0007336 A1 | * | 7/2001 | Jelloul | G05D 23/1346 236/12.11 |
| 2003/0155427 A1 | * | 8/2003 | Eveleigh | G05D 23/134 236/12.14 |
| 2005/0139688 A1 | * | 6/2005 | Yang | F16K 31/002 236/12.11 |

(Continued)

OTHER PUBLICATIONS

Watts Water Technologies, Inc., "Powers New TempTAP™ ASSE 1070 Faucet Series with Integrated Thermostatic Valve", webpage: http://www.powerscontrols.com/pages/new_products/TempTAP.asp; copyright 2015, printed Oct. 27, 2015, 2 pages.

*Primary Examiner* — Marc E Norman
*Assistant Examiner* — Schyler S Sanks
(74) *Attorney, Agent, or Firm* — Michael Best & Friedrich LLP

(57) ABSTRACT

A hot water valve assembly is disclosed including a dual inlet housing having a cold water inlet and a hot water inlet, a thermostatic mixing cartridge disposed within the dual inlet housing, an inner conduit disposed adjacent to and in fluid communication with the dual inlet housing and a shell including a mixed water outlet that is connected to and in fluid communication with the inner conduit.

21 Claims, 5 Drawing Sheets

(56) References Cited

U.S. PATENT DOCUMENTS

| | | | | |
|---|---|---|---|---|
| 2007/0000547 A1* | 1/2007 | Cochart | ............... | F16K 11/00 |
| | | | | 137/614.2 |
| 2009/0000026 A1* | 1/2009 | Hanson | ............... | E03C 1/04 |
| | | | | 4/695 |
| 2009/0038700 A1* | 2/2009 | Mertens | ............... | E03C 1/04 |
| | | | | 137/896 |
| 2011/0126919 A1 | 6/2011 | Izzy et al. | | |
| 2014/0261781 A1* | 9/2014 | Dolgos | ............... | F16K 11/207 |
| | | | | 137/468 |

* cited by examiner

HOT WATER VALVE WITH INTEGRAL THERMOSTATIC MIXING CARTRIDGE

CROSS-REFERENCE TO RELATED APPLICATION

This application claims priority to U.S. Provisional Application No. 62/342,480, filed May 27, 2016, the contents of which are incorporated by reference for all purposes as if set forth in its entirety.

STATEMENT OF FEDERALLY SPONSORED RESEARCH OR DEVELOPMENT

Not applicable.

TECHNICAL FIELD

This disclosure relates to hot water valves and, more particularly, to hot water valves with an integrated thermostatic mixing cartridge.

BACKGROUND

Water from a water heater is often hotter than desirable for its end use at a plumbing fixture. Although extremely hot water temperatures may be useful in some appliances in which the water does not directly interface with a person, such as a dishwasher, it is problematic for water at such high temperatures to directly contact the end user in other uses, such as faucets for washing. Further, to avoid growth of bacteria during long-term storage, heated water is often stored at very high temperatures (e.g., above 140° F.) rather than lukewarm temperatures (e.g., 105-115° F.) which may be more appropriate for end use.

Accordingly, many faucet and plumbing fixture setups utilize devices that control or regulate the temperature of the output flow of mixed water received from a hot and a cold input. One such temperature control device is a thermostatic mixing cartridge. A thermostatic mixing cartridge blends hot water with cold water to produce tempered hot water, conventionally prior to the introduction of the tempered hot water into the faucet or plumbing fixture in the first instance. Typically, the thermostatic mixing cartridge is plumbed to receive hot and cold water inputs and output a tempered hot water for provision to the hot water connection of the faucet or other plumbing fixture. Separately, cold water is provided to the cold water inlet of the faucet. With this arrangement, even if the user sets the faucet or plumbing fixture to its hottest setting (e.g., opening the hot valve entirely while the cold valve remains closed), the presence of the thermostatic mixing cartridge can limit the maximum output temperature of the faucet or plumbing fixture to that of the tempered hot water and ensure a constant, safe water temperature to prevent thermal shock or scalding of a user.

Unfortunately, to reduce the expense and time associated with installing a faucet or plumbing fixture, many installations lack a thermostatic mixing cartridge prior to the provision of water to the faucet. Further, plumbing codes may dictate when a thermostatic mixing cartridge shall be used.

SUMMARY

To help avoid situations in which an installer omits a thermostatic mixing cartridge, a hot water valve is proposed which incorporates and integrates the thermostatic mixing cartridge into the structure of the hot water valve itself. Among other things, this prevents a thermostatic mixing cartridge from being omitted due to installer error or ignorance and/or can further simplify the installation process, because the faucet only needs to be hooked up to the hot and cold water lines and does not need to be routed into and out of the valve using separate conduit prior to introduction of the water into the faucet.

A hot water valve assembly is disclosed herein that has a dual inlet housing including a cold water inlet and a hot water inlet wherein the dual inlet housing is disposed concentrically with a central valve axis. The assembly further includes a thermostatic mixing cartridge disposed concentrically with the central valve axis within the dual inlet housing, an inner conduit disposed concentrically with the central valve axis adjacent to and in fluid communication with the dual inlet housing, and a shell including a mixed water outlet and disposed concentrically with the central valve axis in which the shell is connected to and in fluid communication with the inner conduit.

In some forms, the dual inlet housing and the inner conduit may be threadably engaged. In some forms, the assembly may include a cap threadably engaged with the dual inlet housing and disposed around the thermostatic mixing cartridge. In some forms, the cold water inlet and the hot water inlet may be disposed orthogonally in one dimension.

In some forms, a central cold axis of the cold water inlet and an intersection point of the central opening axis and the central valve axis may form a plane that is perpendicular to the central valve axis and a central hot axis of the hot water inlet is disposed above the plane. In some forms, the thermostatic mixing cartridge is adjusted by manipulating an adjustment screw.

Additionally, in some forms, the inner conduit may further include a flange disposed to receive a first end of the dual inlet housing and a first end of the shell. In some forms, the shell may be disposed to receive a telescoping end of the inner conduit. In many forms, the dual inlet housing may be threadably engaged with the inner conduit, and the inner conduit may be further threadably engaged with the shell.

In some forms, the shell may comprise a valve opening to receive a hot water valve. In some forms, the mixed water outlet may be disposed at a point along a lower portion of the shell. In some forms, the inner conduit and the dual inlet housing may comprise a unitary piece. In some forms, a telescoping end of the inner conduit may be disposed adjacent to a hot water valve.

In many forms, the dual inlet housing, the inner conduit, and the shell may be made from brass. In some forms, a first check valve is provided in the hot water inlet and a second check valve is provided in the cold water inlet. In some forms, the mixed water outlet may be disposed along an upper portion of the outlet coupling.

In some forms, the hot water valve assembly may further include a hot water valve element which selectively places the cold water inlet and hot water inlet in fluid communication with the mixed water outlet albeit with the thermostatic mixing cartridge being between the inlets and the hot water valve element). The hot water valve element may be a quarter-turn ceramic valve, although other types of valve elements might also be used that regulate the overall flow of water through the valve element. The inner conduit may have a valve seat on one axial end thereof and a seal may be formed between the hot water valve element and the valve seat.

These and still other advantages of the invention will be apparent from the detailed description and drawings. What follows is merely a description of some preferred embodiments of the present invention. To assess the full scope of the invention, the claims should be looked to as these preferred embodiments are not intended to be the only embodiments within the scope of the claims.

BRIEF DESCRIPTION OF THE FIGURES

In FIG. 5, an example hot water valve element is also schematically illustrated (with this valve element not being illustrated in the other views).

DETAILED DESCRIPTION

Figure 1:
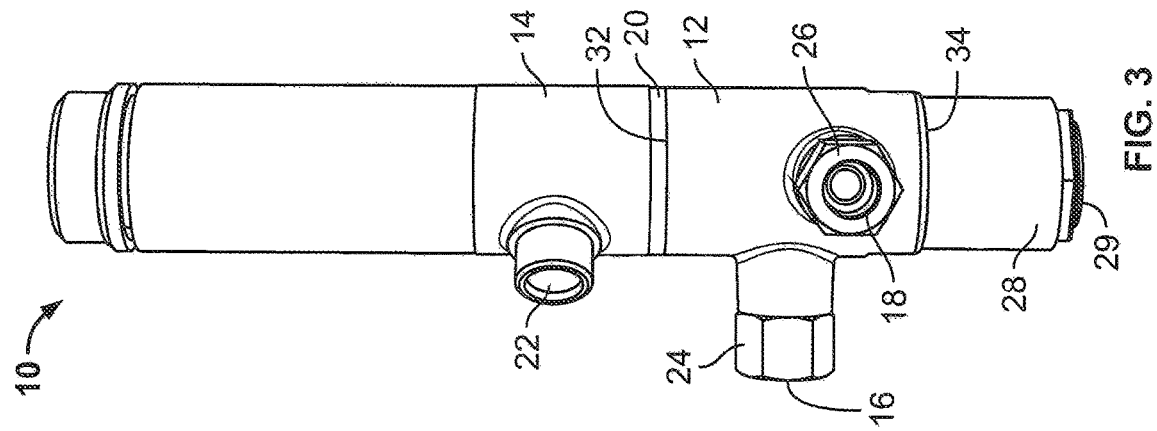
FIG. 1 is a side view of a hot water valve assembly with integrated thermostatic mixing cartridge showing the water inlets and outlet.

Before any embodiments of the invention are explained in detail, it is to be understood that the embodiments described are not limited in application to the details of construction and the arrangement of components set forth in the following description or illustrated in the following drawings. The described apparatus is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the apparatus described herein. Various modifications to the illustrated embodiments will be readily apparent to those skilled in the art, and the generic principles herein can be applied to other embodiments and applications without departing from the embodiments described herein below. Thus, embodiments of the described apparatus are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the described embodiments. Skilled artisans will recognize the examples provided herein have many useful alternatives and fall within the scope of the described embodiments.

Referring now to the drawings in which like reference numerals designate like or corresponding parts throughout the several views, FIGS. 1-4 show an embodiment of a hot water valve assembly 10 in which a housing is provided for a control valve that utilizes an integral thermostatic mixing cartridge. A hot water valve assembly of this type may be used in a widespread faucet assembly, for example, in which a central faucet spout is spaced from a cold water valve assembly and a hot water valve assembly that separately are connected to the central faucet spout (via tubes, pipes, flexible hoses, or the like) to provide water to the spout.

The hot water valve assembly 10 has a dual inlet housing 12, an outlet coupling or shell 14, an inner conduit 20, and a cap 28. In this embodiment, the dual inlet housing 12 has a top end 32 and a bottom end 34, the top end 32 and bottom end 34 being threaded to engage with the inner conduit 20 and the cap 28, respectively. Throughout this disclosure, relative terms such as "above" or "below" are to be construed as referring to the hot water valve assembly 10 in an orientation as it is shown in FIG. 1 wherein the dual inlet housing 12 is shown disposed above the cap 28 and below the outlet coupling 14. Further, one or more o-rings (not shown) may be provided between any one of the elements listed hereinafter for sealing purposes.

Figure 4:
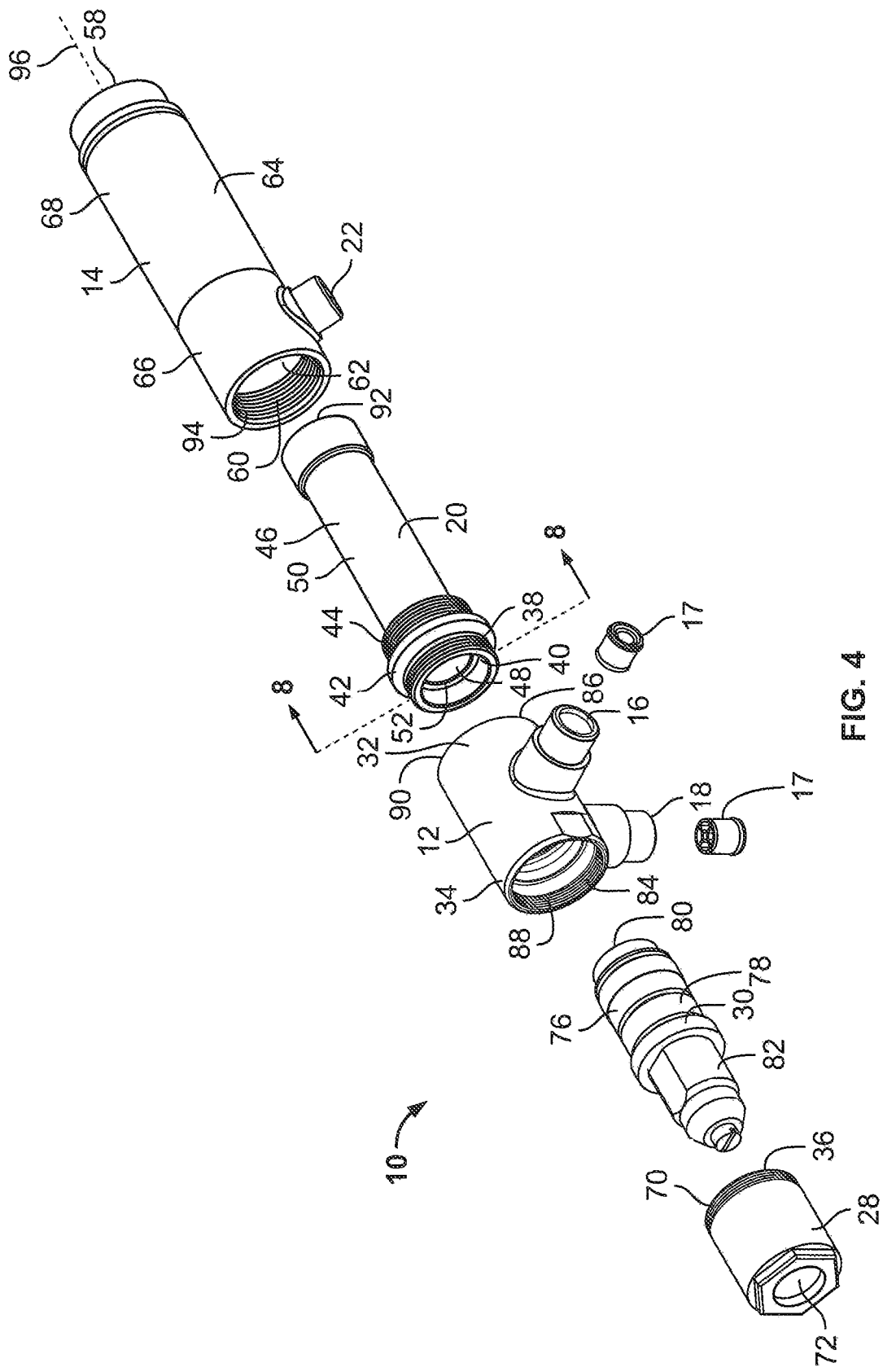
FIG. 4 is an exploded view of the hot water valve assembly shown in FIG. 1.
Figure 5:
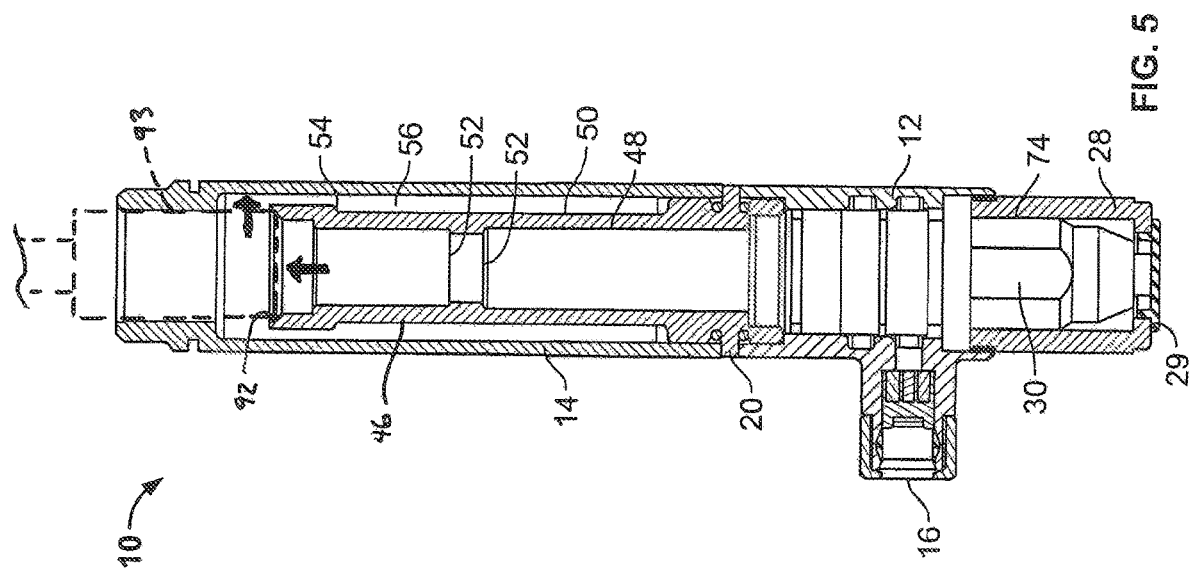
FIG. 5 is a cross-sectional view taken through line 5-5 of the hot water valve assembly shown in FIG. 2 and an elevational view of a thermostatic mixing cartridge shown within the hot water valve assembly.

Referring now more specifically to FIG. 5, the cap 28 has a security cap 29 attached thereto at a distal end thereof. The cap 28 includes male threading 70 that allows the cap 28 to be threadably engaged with female threading 84 of the dual inlet housing 12 when the hot water valve assembly 10 is fully assembled. In another form, the cap 28 may be engaged with the dual inlet housing 12 by snap fit, suction fit, or any other form of engagement. The cap 28 includes a mouth 36 disposed to receive a lower end of a thermostatic mixing cartridge 30. The cap 28 further includes a lower end 72. The lower end 72 may have a hexagonal shape as shown in FIG. 4, or the end 72 may be triangular, circular, square, pentagonal, octagonal, or may have any other shape. As shown in FIG. 5, when the cap 28 is threadably engaged with the dual inlet housing 12, a thermostatic mixing chamber 74 is formed by and within the connection of the cap 28 to the dual inlet housing 12.

The thermostatic mixing cartridge 30 is shown in FIG. 4 having a thermostatic hot water inlet port 76, a thermostatic cold water inlet port 78, a thermostatic mixed water outlet port 80, and a thermostatic element (not shown). The inlet ports 76, 78 are provided by radially outward facing surfaces of the cartridge 30, and the outlet 80 is at a top axial end of the cartridge 20. During use, hot water and cold water enter through meshed surfaces of the thermostatic hot water inlet port 76 and the thermostatic cold water inlet port 78, respectively, and tempered or mixed water exits the mixed water outlet port 80. The thermostatic element may comprise an expandable wax element that expands and contracts depending on the temperature of the hot water and cold water being received into the thermostatic mixing cartridge 30. It should be noted that other thermostatic mixing cartridges could be used.

Figure 7:
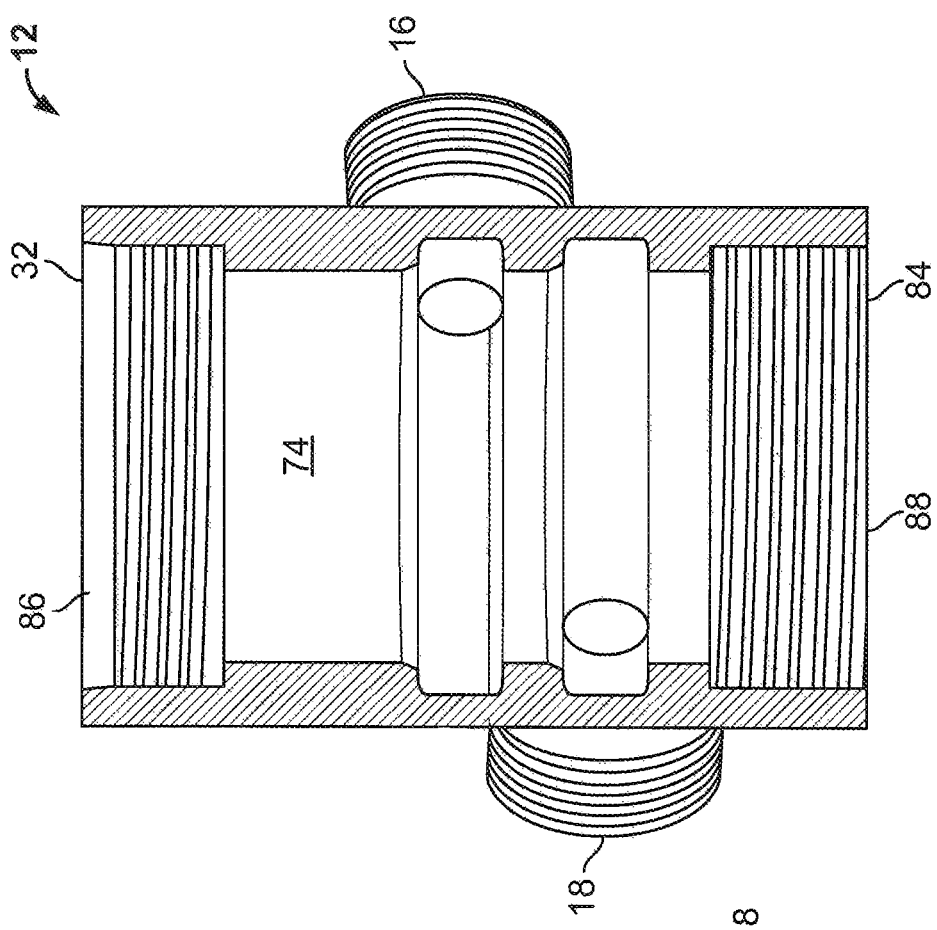
FIG. 7 is a cross-sectional view of the dual inlet housing taken through line 7-7 of FIG. 6.
Figure 6:
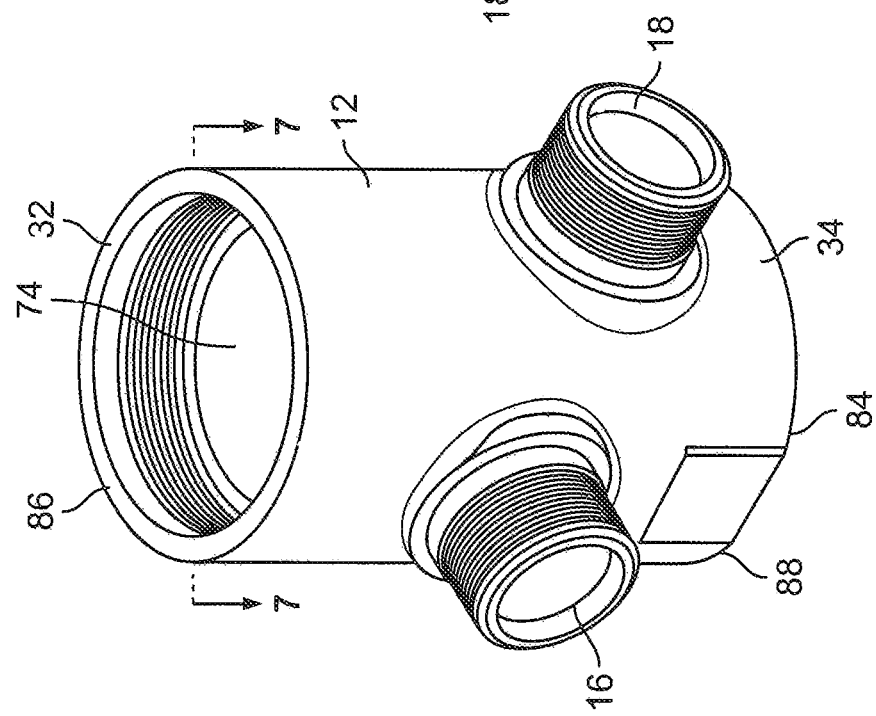
FIG. 6 is an isometric view of a dual inlet housing of the hot water valve assembly shown in FIG. 1.

Referring to FIGS. 6 and 7, the dual inlet housing 12 of the hot water valve assembly 10 is shown in greater detail and includes a hot water inlet 16 and a cold water inlet 18. In a preferred embodiment, the cold water inlet 18 is disposed below the hot water inlet 16 (that is, further from the outlet coupling 14). However, in alternative embodiments, the hot water inlet 16 is disposed below the cold water inlet 18 or may be disposed in some other configuration not specifically discussed herein. As best shown in FIGS. 1, 6, and 7, the inlets 16, 18 are approximately 90 degrees offset relative to an axis 96 defined by a central axis of the hot water valve assembly 10. The orientation of the inlets 16, 18 may be altered based on the thermostatic mixing cartridge 30 used, or may be altered for any other reason. Referring again to FIG. 4, check valves 17 are shown, which, when disposed within the inlets 16, 18, regulate the flow of water into the dual inlet housing 12. The check valves 17 may be different valves, or may be the same valve.

Figure 8:
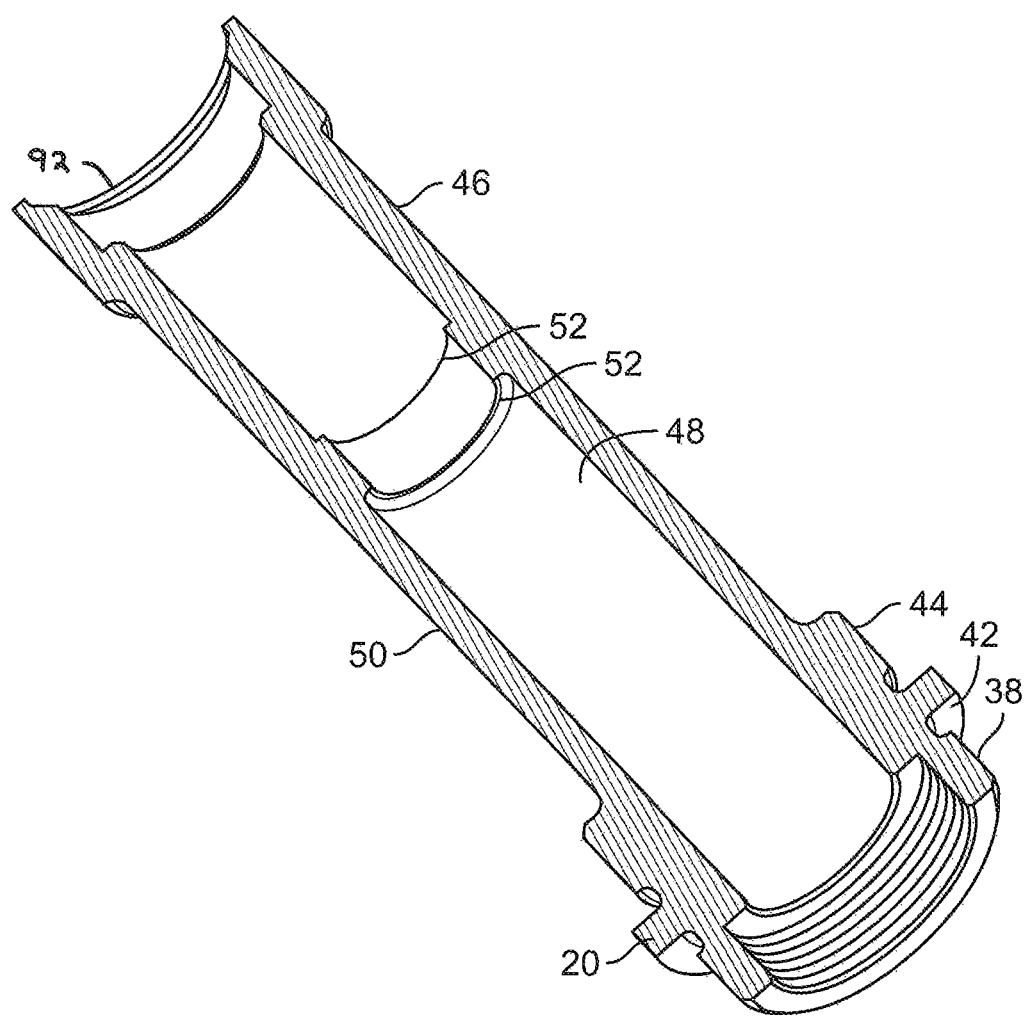
FIG. 8 is a cross-sectional view taken through line 8-8 of the inner conduit shown in FIG. 4.

The inner conduit 20, shown most clearly in FIGS. 4 and 8, includes inlet threading 38 disposed peripherally around an inlet opening 40. The inner conduit 20 further includes a flange 42 disposed adjacent to the inlet threading 38 which abuts the dual inlet housing 12 and the outlet coupling 14 on opposing sides of the flange 42. The flange 42 creates a reference plane for locating the thermostatic mixing cartridge 30. In another form, the inner conduit 20 may not include a flange 42. In still another form, the flange may be thicker or thinner than the flange 42 shown in FIG. 4.

Referring to FIGS. 4 and 8, the inner conduit 20 further includes outlet threading 44 disposed adjacent to the flange 42 and operative to threadably engage the outlet coupling 14. A telescoping end 46 having a valve seat 92 is disposed adjacent to the outlet threading 44. As shown in FIG. 5, the telescoping end 46 of the inner conduit 20 is capable of insertion within the outlet coupling 14. The valve seat 92 acts as a seat for a quarter turn cartridge or other hot water valve element 93 (shown in FIG. 5) which may be controlled by the rotation of the handle connected to a stem of the hot water valve element 93, for example.

Further referring to FIG. 5, the inner conduit 20 includes an inner surface 48 and an outer surface 50. The inner surface 48 comprises the surface area of the inner part of the telescoping end 46 whereas the outer surface 50 comprises the surface area of the outer portion of the telescoping end 46. The inner surface 48 may include one or more radial steps 52, as seen in FIGS. 5 and 8, and the outer surface 50 may also include one or more radial steps 54. The steps 52, 54 are included to maintain a uniform wall thickness. The telescoping end 46 may include more or fewer radial steps 52, 54 depending on the desired water flow output of the hot water valve assembly 10 and the desired structure or functionality of the inner conduit 20 (for example, to provide increased wall thickness or to modify the dimensions over the axial length of the coupling 20). The steps 52, 54 may be formed to receive other coupling elements, or may be formed to receive valve elements such as a hot water valve (not shown).

With reference again to FIG. 4, the outlet coupling or shell 14 includes a valve-receiving opening 58 being formed to receive a hot water valve element (e.g., element 93 schematically illustrated in FIG. 5) axially therein and an inner conduit opening 60 which receives the inner conduit 20. The outlet coupling 14 further comprises an inner surface 62 and an outer surface 64, and is further defined by a lower portion 66 and an upper portion 68. In some embodiments, the upper portion 68 is threaded. The tempered water outlet 22 is disposed at a point along the lower portion 66 of the outlet coupling 14 as best shown in the FIGS. 1-4; however, the tempered water outlet 22 may be disposed at other locations on the outer surface 64 of the outlet coupling 14.

As shown in FIGS. 4 and 5, the telescoping end 46 of the inner conduit 20 is telescopically received in the outlet coupling 14. When the inner conduit 20 and the outlet coupling 14 are assembled, as best shown in FIG. 5, an outlet chamber 56 is partially defined by the outer surface 50 of the inner conduit 20 and the inner surface 62 of the outlet coupling 14. The outlet chamber 56 is volumetric and is filled with water when the hot water valve assembly 10 is in use.

Figure 2:
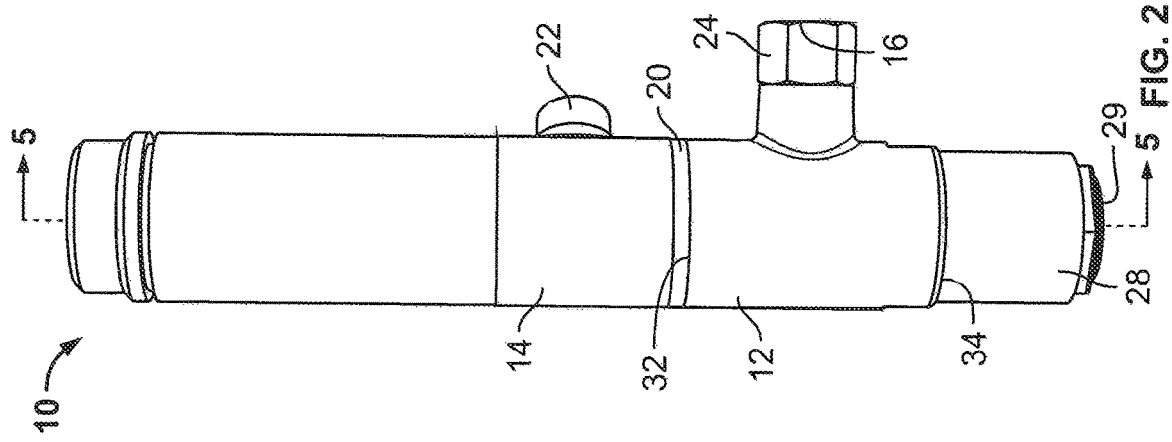
FIGS. 2 and 3 are additional side views of the hot water valve assembly shown in FIG. 1.
Figure 3:
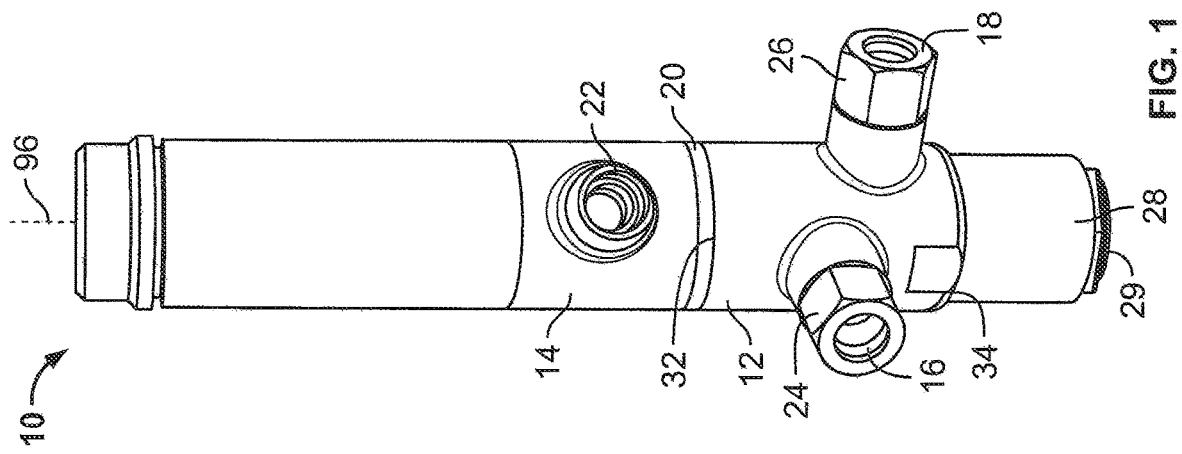

Referring now to FIG. 4, to assemble the hot water valve assembly 10, the thermostatic mixing cartridge 30 is placed within the dual inlet housing 12, and the mouth 36 of the cap 28 is threadably engaged with threading 84 of the bottom end 34 of the dual inlet housing 12 to form the thermostatic mixing chamber 74. The top end 32 of the dual inlet housing 12 is then threadably engaged with an inlet end 38 of the inner conduit 20 such that the lower face of the flange 42 abuts an upper face of an outlet end 86 of the dual inlet housing 12. This effectively assembles and captures the thermostatic mixing cartridge 30 between the dual inlet housing 12 and the connected cap 28 and inner conduit 20 such that any water coming in inlet ports 16 and 18 must pass through the thermostatic mixing cartridge 30 before exiting the outlet 80 of the thermostatic mixing cartridge 30 into the central passage of the inner conduit 20. To complete the assembly of the housing, the threading 94 of the inner conduit opening 60 of the outlet coupling 14 is threadably engaged with the outlet threading 44 of the inner conduit 20 to join the outlet coupling 14 to the inner conduit 20. When fully assembled, the hot water valve assembly is as shown in FIGS. 1-3, although, as noted below a hot water valve element may also be added as shown in FIG. 5, with a nut cap or other securing element holding the valve in the opening on one axial end. In a fully assembled form, the outer surfaces of the cap 28, the dual inlet housing 12, the dual inlet housing 20, and the outlet coupling 14 are generally flush with respect to one another.

It will be further appreciated that, in further assembly, a hot water valve element 93, such as a quarter-turn ceramic valve, can be received in the upper axial opening (i.e., the valve-receiving opening 58) of the outer coupling 14 such that the valve element 93 seats against the valve seat 92 to selectively place the central passage of the telescoping end 46 of the inner conduit 20 in fluid communication with the outlet chamber 56 between the outer surface 50 of the inner conduit 20 and the inner surface 62 of the outlet coupling 14 depending on whether the valve element is opened or closed (which, is subsequently in fluid communication with the mixed water outlet 22). In one instance, water could flow axially into the valve element from the inside of the inner conduit 20 (as depicted by a first bold arrow in FIG. 5) and out of a radial opening in selective communication with the outlet chamber 56 (as depicted by a second bold arrow in FIG. 5) depending on the opened or close state of the valve element.

When the hot water valve element 93 is open to permit the flow of water therethrough, the flow of water through the entire hot water valve assembly 10 is discernible from FIGS. 4 and 5. Cold water enters through the cold water inlet 18 and hot water enters through the hot water inlet 16 of the dual inlet housing 12. Once the cold water and hot water have passed through the inlets 16, 18, the water is in fluid communication with the thermostatic mixing chamber 74 and the thermostatic mixing cartridge 30. The flow of cold water and the flow of hot water are then mixed in the thermostatic mixing cartridge 30 and tempered water flows from the outlet port 80 of the thermostatic mixing cartridge 30 into the central passageway (which is defined by inner walls 48) of the inner conduit 20.

The tempered water flows upward toward the valve seat 92 of the telescoping end 46 of the inner conduit 20 where the water is in fluid communication with the outlet chamber 56 so long as the hot water valve element 93 remains opened. A variable amount of tempered water exits the telescoping end 46 of the inner conduit 20 based on a state of the hot water valve element 93. For instance, if the hot water valve element 93 is in a closed configuration, then the tempered water will not be permitted to exit the telescoping end 46 of the inner conduit 20 to enter the outlet chamber 56. However, if the hot water valve element 93 is in an open configuration, at least some tempered water will be permitted to exit the telescoping end 46 of the inner conduit 20 and will enter the outlet chamber 56. The flow rate of water may be established by the degree to which the valve element 93 is opened.

When mixed water flows into the outlet chamber 56, the mixed water is also in fluid communication with the tempered or mixed water outlet 22. When mixed water enters the mixed water outlet 22, it enters a hose or pipe (not shown) which allows the mixed water to flow to a spout (not shown) of the faucet assembly or to another mixing chamber (not shown) where the mixed water may be further mixed with other water.

The cap 28, the dual inlet housing 12, the inner conduit 20, and the outlet coupling 14 (collectively the assembly parts) may all be made of the same material, or may be made of different materials. The assembly parts may be made of brass, die-cast zinc, chrome-plated polymer, pewter, copper, bronze, plastic, composite, or stainless steel. The assembly parts may also be made of a mixture including brass, copper, zinc and/or lead.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A faucet assembly comprising:
   a faucet spout;
   a cold water valve assembly having a cold water inlet and a cold water outlet in fluid communication with the faucet spout; and
   a hot water valve assembly including:
   a housing,
   a thermostatic mixing cartridge at least partially positioned within the housing, the thermostatic mixing cartridge having a hot water inlet, a cold water inlet, and a mixed water outlet, wherein the mixed water outlet is in fluid communication with the faucet spout, and
   a hot water valve at least partially positioned within the housing, the hot water valve configured to control the flow of water through the mixed water outlet,
   wherein the faucet spout receives a first fluid flow from the mixed water outlet and a second fluid flow from the cold water outlet.

2. The faucet assembly of claim 1, wherein the hot water valve is continuously adjustable between an open configuration and a closed configuration.

3. The faucet assembly of claim 1,
   wherein the housing includes the cold water inlet and the hot water inlet wherein the dual inlet housing is disposed concentrically with a central valve axis;
   wherein the thermostatic mixing cartridge is disposed concentrically with the central valve axis within the dual inlet housing, wherein the thermostatic mixing cartridge includes a mixed water outlet port;
   an inner conduit disposed concentrically with the central valve axis, wherein the inner conduit at least partially defines a channel therein, wherein the channel is in fluid communication with the mixed water outlet port, and wherein the inner conduit includes a valve seat at an end opposite the thermostatic mixing cartridge;
   a shell including the mixed water outlet port and disposed concentrically with the central valve axis, wherein the shell at least partially receives the inner conduit therein to define an outlet chamber therebetween; and
   a hot water valve element connected to a handle of a fixture for operation and configured to engage the valve seat of the inner conduit, wherein the hot water valve element controls a flow of water from the mixed water outlet port through the hot water valve assembly, and wherein the hot water valve element is adjustable between a closed configuration, in which the inner conduit is fluidly isolated from the outlet chamber, and a plurality of open configurations, in which the inner conduit is in fluid communication with the outlet chamber.

4. The faucet assembly of claim 3 wherein the housing and the inner conduit are threadably engaged.

5. The faucet assembly of claim 3, further comprising a cap threadably engaged with the housing and disposed around the thermostatic mixing cartridge.

6. The faucet assembly of claim 3, wherein the cold water inlet and the hot water inlet are disposed orthogonally in one dimension.

7. The faucet assembly of claim 3, wherein a central cold axis of the cold water inlet and an intersection point of the central cold axis and the central valve axis form a plane that is perpendicular to the central valve axis; and a central hot axis of the hot water inlet is disposed above the plane.

8. The faucet assembly of claim 7, wherein the thermostatic mixing cartridge is adjusted by manipulating an adjustment screw.

9. The faucet assembly of claim 3 wherein the inner conduit further includes a flange disposed to receive a first end of the dual inlet housing and a first end of the shell.

10. The faucet assembly of claim 9 wherein the shell is disposed to receive a telescoping end of the inner conduit.

11. The faucet assembly of claim 3 wherein the housing is threadably engaged with the inner conduit, and the inner conduit is further threadably engaged with the shell.

12. The faucet assembly of claim 3 wherein the shell further comprises a valve opening to receive the hot water valve element.

13. The faucet assembly of claim 3 wherein the shell is defined by a lower portion and an upper portion, and the mixed water outlet port is disposed at a point along the lower portion of the shell.

14. The faucet assembly of claim 3 wherein the inner conduit and the housing together form a unitary piece.

15. The faucet assembly of claim 3 wherein the housing, the inner conduit, and the shell are made from brass.

16. The faucet assembly of claim 3 further comprising a first check valve provided in the hot water inlet and a second check valve provided in the cold water inlet.

17. The faucet assembly of claim 3 wherein the shell is defined by a lower portion and an upper portion, and the mixed water outlet port is disposed along the upper portion of the shell.

18. The faucet assembly of claim 3 wherein the hot water valve element is a quarter-turn ceramic valve.

19. The faucet assembly of claim 3 wherein a flow rate of water through the hot water valve assembly for each of the plurality of open configurations is established by a degree to which the hot water valve element is opened.

20. A faucet assembly comprising:
a faucet spout;
a cold water valve assembly having a cold water inlet and a cold water outlet in fluid communication with the faucet spout; and
a hot water valve assembly including:
a housing,
a thermostatic mixing cartridge at least partially positioned within the housing, the thermostatic mixing cartridge having a hot water inlet, a cold water inlet, and a mixed water outlet, wherein the mixed water outlet is in fluid communication with the faucet spout, and
a hot water valve at least partially positioned within the housing, the hot water valve configured to control the flow of water from the mixed water outlet, the hot water valve having a hot water valve outlet, wherein the cold water outlet and the hot water valve outlet are in constant fluid communication with the faucet spout.

21. A faucet assembly comprising:
a faucet spout;
a cold water valve assembly having a cold water inlet and a cold water outlet in fluid communication with the faucet spout; and
a hot water valve assembly including:
a housing,
a thermostatic mixing cartridge at least partially positioned within the housing, the thermostatic mixing cartridge having a hot water inlet, a cold water inlet, and a mixed water outlet, wherein the mixed water outlet is in fluid communication with the faucet spout, and
a hot water valve at least partially positioned within the housing, the hot water valve configured to control the flow of water through the mixed water outlet,
wherein the faucet spout is configured so that the flow from the cold water output mixes with the flow from the mixed water outlet.

* * * * *